UNITED STATES PATENT OFFICE.

MORRIS H. SMITH, OF BROOKLYN, NEW YORK.

IMPROVED MODE OF CURING PORK.

Specification forming part of Letters Patent No. 57,203, dated August 14, 1866; antedated August 8, 1866.

*To all whom it may concern:*

Be it known that I, MORRIS H. SMITH, of Brooklyn, in the county of Kings, in the State of New York, have invented a new and Improved Mode of Curing Pork Hams and Shoulders; and I do hereby declare that the following is a full and exact description of the same, reference being had to the annexed drawing, making part of this specification, which is a perspective view.

The method of curing which I improve upon is known as the "dry cure," and is performed as follows: The fleshy parts of the joints are rubbed with salt and other ingredients; they are then placed in a tray or headed up in a tight cask. The juices of the meat, uniting with the ingredients, form a brine, (without the use of water,) with which the meat is kept covered by basting in the one case, or frequently rolling the cask in the other, until the meat is cured.

The nature of my improvement consists in suspending the joints to be cured, by means of a series of parallel bars, in rows, one row above another, to the ceiling of the room, if desired. The bars are so near together that the butt or larger end of the ham or shoulder cannot pass between them. By placing the shank down between the bars, the meat resting upon them, and leaning the skin side of the butt of the first piece against the wall or other support, and then leaning the balance of the meat in the row one piece against the other, with the fleshy side upward, it will be placed in the most favorable position for receiving and absorbing the brine, which is made as described in the foregoing.

The floor of the room where the hams or shoulders are curing should be cemented or otherwise made tight, and so arranged that the brine will run into some receptacle, from which it is to be pumped or otherwise conveyed to the uppermost rows of meat, over which it is to be poured or sprinkled. This may be done by means of troughs perforated with fine holes, which would distribute the brine more slowly.

The arrangement of the meat which I have described, one row above another, and which is shown in the annexed drawing, ($h$ representing the hams, and $b$ the bars and framework,) causes the brine to drip from one piece of meat to another, till it reaches the floor or any receptacle provided for it.

The tapering shape of the joint concentrates brine at the shank and causes it to drip well upon the butt of that beneath.

The advantages of my method contrasted with the others are—

First, in piling meat together on shelves or in trays or casks the weight of the meat will, in a measure, prevent the lower pieces from absorbing pickle, whereas no position could be more favorable for this purpose than that devised by me.

Second, in my plan, if the hams should be piled twelve rows high the brine from each ham would pass over the other eleven. In basting in trays they could only be piled some three or four high, and this advantage would be nearly lost.

Third, a large number of joints can be cured in a small space. In cities where room is of much value this is quite important.

Fourth, in ice-house curing in the summer the room saved is of great importance, as it is desirable to keep the meat near the ice. It also allows the cold air to circulate around the meat, which it could not do in tight casks.

Fifth, the method of curing called the "dry cure," which I have described, is generally recognized among pork-packers as the best. It is not generally used, on account of the trouble, expense, and room required. My plan obviates these objections.

What I claim as my invention, and desire to secure by Letters Patent, is—

The suspending of hams and shoulders, during the process of curing, with the butt upward and the shank down, in such a way that the brine dripping from one ham will fall on that beneath, as herein described, using for that purpose parallel bars, or any other means substantially the same, and which will produce the intended effect.

MORRIS H. SMITH.

Witnesses:
E. O. BURLING,
FLOYD CLARKSON.